Nov. 1, 1932.  W. S. HAMM  1,886,011
SASH CONSTRUCTION
Filed March 14, 1931
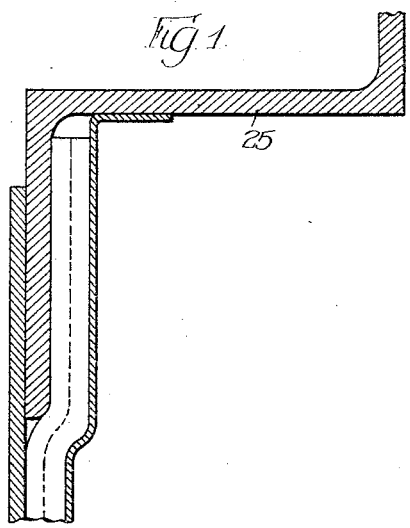
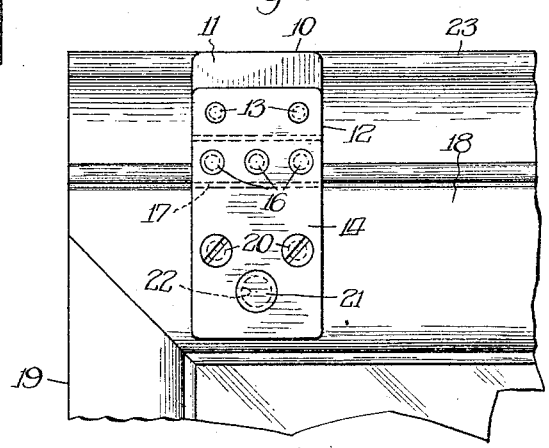
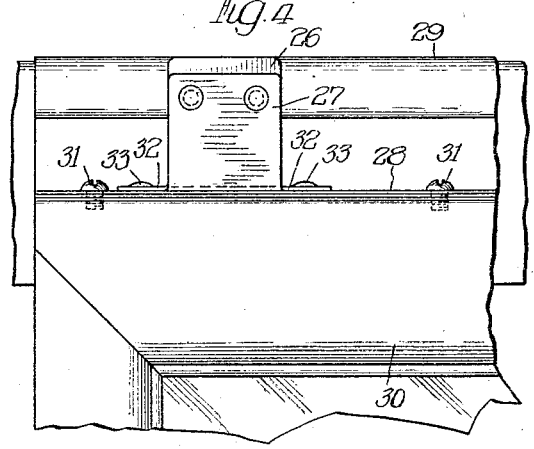
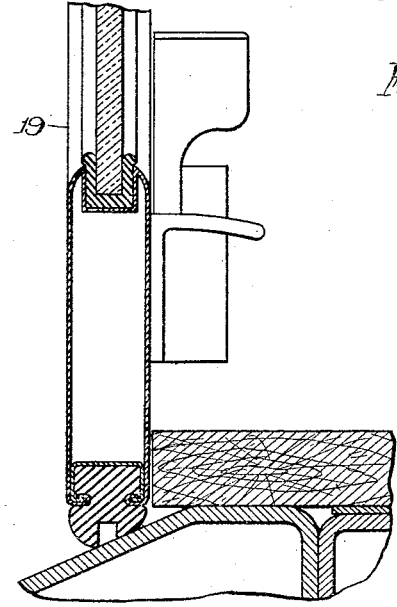
Inventor:
William S. Hamm,
By Romures, Thrist + Warden
Attys Patented Nov. 1, 1932

1,886,011

UNITED STATES PATENT OFFICE

WILLIAM S. HAMM, OF ELKHART, INDIANA, ASSIGNOR TO THE ADLAKE COMPANY, OF CHICAGO, ILLINOIS, A CORPORATION OF ILLINOIS

SASH CONSTRUCTION

Application filed March 14, 1931. Serial No. 522,695.

The object of this invention is to provide a novel bumper for application to the top rail of a vertically slidable sash, which bumper is inexpensive to manufacture, is easy to apply, and can be used advantageously in combination with an upwardly extending top rail weather strip in protective relation to the latter.

Two different forms of the invention are presented herein for the purpose of exemplification, but it will of course be appreciated that the invention is capable of embodiment in other structurally modified forms coming equally within the scope of the appended claims.

In the accompanying drawing:

Fig. 1 is a vertical section through a window equipped with the bumper of the invention;

Fig. 2 is an inside face view of the bumper shown in Fig. 1;

Fig. 3 is a fragmentary vertical section through a window equipped with a structurally modified form of the bumper; and Fig. 4 is an inside face view of the bumper shown in Fig. 3.

In the embodiment of the invention shown in Figs. 1 and 2, the bumper 10 consists of a rubber block 11 of rectangular form which is seated in an upwardly opening metal bracket 12 of U-shaped cross section. The lower portion of the block 11 is securely fastened in the bracket 12 by transfixing rivets 13, while the upper portion of the block projects upwardly from the bracket to provide a cushioning element.

The bracket 12 is composed of a vertically extending plate 14 and an angle strip 15. The strip 15 is attached to the upper portion of the plate 14 by rivets 16, to form therewith the socket for the block 11, and is provided with an outturned bottom flange 17 for abutment with the upper inner edge of the top rail 18 of the sash 19 to which applied. The lower portion of the plate 14 is positioned against the inner face of the top rail 18 and is detachably secured thereto by screws 20. A stud 21, which is carried by the lower portion of the plate 14 adjacent the screws 20, extends into an aperture 22 in the top rail and serves to relieve the screws from sheering stresses.

The bumper 10, by reason of its location above the inner portion of the top rail 18, and its attachment to the inner face of the top rail, affords ample room for the application of an upwardly and outwardly projecting weather strip 23 to the top rail. The weather strip on the top rail may be of any suitable construction. The particular construction shown incidentally embodies an improvement which is disclosed and claimed in Levan application Serial No. 310,767 filed October 6, 1928. The extent of upward projection of the bumper 10 is preferably about the same as that of the weather strip 23.

When the sash 19 is in its closed position—which is the position shown in Fig. 1—the weather strip 23 is in sealed engagement with the header 24 of the window frame, and, when the sash is raised as far as it will go, the rubber block 11 of the bumper will contact with the upper end 25 of the recess provided above the header for the sash, thereby bringing the sash to a cushioned stop and preventing the upstanding portion of the weather strip from being injured. In this form of the invention, the bumper may be applied or removed without disturbing the weather strip, and, similarly, the weather strip may be applied or removed without disturbing the bumper. If only one bumper is used, the same is attached to the top rail at approximately the center of the latter, while if two bumpers are used, they are mounted adjacent the ends of the top rail.

In the embodiment of the invention shown in Figs. 3 and 4, the bumper, as in the first embodiment, includes a rectangular rubber block 26 and a U-shaped holding bracket 27. In the second form, however the bracket is a one-piece member and is attached to a horizontally extending flange 28 on the weather strip 29 instead of being directly attached to the top rail 30. The particular weather strip 29 happens to embody certain improvements which are disclosed and claimed in Sevison application Serial No. 516,536, filed February 18, 1931, but the bumper could be used in the same way with any suitable weather strip having a mounting surface similar to the flange 28. The weather strip 29 is detachably secured to the top rail 30 by screws 31 which permit the application or removal of the weather strip and bumper as a unit. The bracket 27 of the bumper is provided at opposite ends of its base with horizontally extending ears 32 which are disposed flatly against and are fixedly secured to the inner portion of the flange 28 by rivets 33.

I claim:

1. In sash construction, in combination, a vertically slidable sash, an upstanding weather strip on the top rail of the sash, and an upstanding bumper on the top rail behind the weather strip, said bumper being so arranged with respect to the weather strip as to protect the latter and prevent the upstanding portion thereof from being subjected to any vertically directed compressive forces when the sash is moved into its uppermost position.

2. In sash construction, in combination, a vertically slidable sash, an upstanding weather strip on the top rail of the sash, an upwardly opening U-shaped bracket on the top rail behind the weather strip, and a cushion block positioned in the bracket.

3. A top rail bumper, consisting of an upwardly opening U-shaped bracket, and a cushion block positioned in the bracket with the upper end of the block projecting above the upper end of the bracket.

4. A top rail bumper, consisting of an upwardly opening U-shaped bracket having an extension which is adapted to be positioned flatly against and secured to the top rail of a sash, and a cushion block fastened in the bracket with the upper end of the block projecting above the upper end of the bracket.

5. In a top rail bumper, a rubber block, and a one-piece sheet metal bracket for supporting the block characterized by a horizontal bottom web, two vertical side flanges of less height than the block, and two horizontal end tongues, said side flanges embracing the sides of the block, and said end tongues being apertured for the reception of suitable attaching means.

6. In a top rail bumper, a vertically extending strip, a relatively short angular strip connected to the upper portion of the vertically extending strip in such a way as to form therewith an upwardly opening U-shaped socket and an abutment below the socket for engagement with the upper surface of the top rail of a sash, and a rubber block seated in the socket, the lower portion of the vertically extending strip being apertured for the reception of suitable means for attaching such portion flatly against the inner face of the top rail.

7. In sash construction, in combination, a vertically slidable sash, an upstanding weather strip detachably secured to the top rail of the sash, and an upstanding bumper fastened to the weather strip in a position behind the latter, said bumper being so arranged with respect to the weather strip as to protect the latter and prevent the upstanding portion thereof from being subjected to any vertically directed compressive forces when the sash is moved into its uppermost position.

8. In a top rail bumper, a cushioning block, and a supporting bracket for the same, characterized by a seat to which the block is secured in upwardly projecting relation to the bracket, a downwardly extending flange for attachment against one of the side faces of a top rail, and a downwardly facing shoulder between the seat and the flange for engagement with the top face of the rail.

9. In a top rail bumper, a cushioning block, and a supporting bracket for the same, characterized by a seat to which the block is secured in upwardly projecting relation to the bracket, a downwardly extending flange for attachment against one of the side faces of a top rail, and a downwardly facing shoulder between the seat and the flange for engagement with the top face of the rail, said shoulder being located directly beneath the seat at one side of the flange.

10. In a top rail bumper, a cushioning block, and a supporting bracket for the same, characterized by a seat to which the block is secured in upwardly projecting relation to the bracket, and an attaching portion of generally L-shape cross section beneath the seat which is adapted to interfit with and be secured to one of the upper corners of a top rail.

11. In a top rail bumper, a cushioning block, and a one-piece sheet metal bracket for supporting the block, said bracket being characterized by two opposed vertically extending side walls between which the lower portion of the block is confined, and two horizontally extending apertured end tongues at the bottom of said side walls for the reception of suitable attaching means.

In testimony whereof, I have hereunto subscribed my name.

WILLIAM S. HAMM.